United States Patent [19]

Doi

[11] Patent Number: 4,890,448
[45] Date of Patent: Jan. 2, 1990

[54] MOWING BLADE UNIT

[75] Inventor: Hachiro Doi, Saitama, Japan

[73] Assignee: Ahresty Corporation, Tokyo, Japan

[21] Appl. No.: 179,289

[22] Filed: Apr. 8, 1988

[30] Foreign Application Priority Data

| Apr. 13, 1987 | [JP] | Japan | 62-56629[U] |
| Sep. 10, 1987 | [JP] | Japan | 62-139214[U] |
| Nov. 4, 1987 | [JP] | Japan | 62-169143[U] |

[51] Int. Cl.⁴ ............................................. A01D 34/73
[52] U.S. Cl. .......................................... 56/255; 30/240; 56/295
[58] Field of Search ............... 56/255, 256, 295, 17.5, 56/DIG. 17; 30/240, 347, 263, 264, 265

[56] References Cited

U.S. PATENT DOCUMENTS

| 2,212,057 | 8/1940 | Waller | 30/240 X |
| 2,973,616 | 3/1961 | Richard | 56/256 |
| 3,618,304 | 11/1971 | Hundhausen | 56/255 X |
| 4,520,619 | 6/1985 | Doi et al. | 56/255 X |
| 4,733,525 | 3/1988 | Pellenc et al. | 56/255 X |

FOREIGN PATENT DOCUMENTS

| 55-45328 | 3/1980 | Japan . | |
| 55-46028 | 10/1980 | Japan . | |
| 59-32255 | 9/1984 | Japan . | |
| 496570 | 11/1938 | United Kingdom | 56/256 |

Primary Examiner—Hoang C. Dang
Attorney, Agent, or Firm—Watson, Cole, Grindle & Watson

[57] ABSTRACT

This invention relates to an improvement of a mowing blade unit in which a rotary blade and a fixed blade are overlapped to each other in coaxial relation to each other so as to cut the weeds under rotation of the rotary blade, wherein the circumferential edges of the rotary blade are formed with concave-shaped blade portions curved toward its rotating direction, the circumferential edges of the fixed blade are formed with a plurality of convex-shaped blade portions oppositely and slidably contacting with the concave-shaped blade portions with a specified holding angle, thereby the concave-shaped blade portions at the circumferential edges of the rotary blade take weeds into areas between each of the convex-shaped blade portions at the circumferential edges of the fixed blade and the rotary blade to hold the weeds with the convex-shaped blade portions with a specified holding angle and to made a positive cutting of the weeds to improve an efficiency of cutting operation.

5 Claims, 3 Drawing Sheets

MOWING BLADE UNIT

FIELD OF THE INVENTION

This invention relates to a moving blade unit for cutting weeds and the like, and more particularly a mowing blade unit in which a rotary blade and a fixed blade are overlapped coaxially and weeds and the like are cut under a rotation of the rotary blade.

The mowing blade unit of the present invention becomes a weeder if it is fixed at an extremity end of a holding column provided with a motor and becomes a weeder or a lawn mower if it is assembled into a machine frame provided with wheels or motor.

DESCRIPTION OF THE PRIOR ART

Japanese Utility Model Publication No. 55-46028 discloses a blade unit in which a rotary blade is formed as a flat disk plate which is similar to a fixed blade and provided with comb-like blades projected oppositely and slidably contacted with each of the blades of the fixed blades at its circumferential edge. In Japanese Patent Laid-Open No. 55-45328 and Utility Model Publication No. 59-32255 a rotary blade of flat disk and provided with curved-shaped blades projected and formed at its circumference is overlapped coaxially on a fixed blade.

However, since the rotary blade of the former blade unit has its blade portions projecting radially and linearly, not only a poor cutting of weeds occurs, but also the weeds taken into the device at once are easily released along the blade edges to leave a large amount of non-cut weeds, such that the cutting operation efficiency deteriorates.

However, the rotary blade of the former blade unit entirely shows a poor efficiency of cutting operation in which not only a poor taking of weeds is found, but also the weeds taken into the device at once are easily released along the blade edges to cause a large amount of non-cut weeds to be left due to the fact that the rotary blade is of such a shape as one having the blade projected radially and linearly.

In turn, although the rotary blade of the latter blade unit can resolve the former problems, it shows a poor strength that the blade edges strike against gravel or rocks and the like, resulting in that the blade is easily damaged and broken.

OBJECTS AND SUMMARY OF THE INVENTION

It is an object of the present invention to enable a positive cutting of weeds to be performed even under a low speed rotation of a rotary blade and to improve the efficiency of cutting operation.

It is another object of the present invention to enable a positive cutting of even soft and shaky weeds and the like while keeping a sliding contact force between the rotary blade and the fixed blade always at a constant value without being immediately damaged under their striking actions against gravel and rocks and the like.

Further, it is a still further object of the present invention to prevent weeds entering between the rotary blade and the fixed blade from being entangled around a rotary driving shaft having the rotary blade fixed and held thereon.

These and other objects of the present invention will become more apparent in reference to the following detailed description and the drawings.

These objects will be accomplished by the mowing blade unit of the present invention.

Such a mowing blade unit as described above is constructed such that a rotary blade and a fixed blade are overlapped in coaxial relation, the rotary blade is formed with concave-shaped blade portions curved toward its rotating direction, and the fixed blade is formed with a plurality of convex-shaped blades in opposite sliding contact with the concave-shaped blade portions of the rotary blade.

The rotary blade is constructed such that its circumferential edges are raised to form a shallow dish-like shape, blade edge forming portions having top end surfaces opened to form a substantial V-shape or U-shaped in side view are provided at the circumferential edges of the dish-like blade, the height of the other circumferential raised portions other than one side raised portion of the blade forming part positioned in a rotating direction of the rotary blade being formed slightly lower than that of the former one to cause the raised portions to form concave-shaped blades curved toward the rotating direction of the rotary blade.

In addition, a ring-like weed entangling preventive plate is arranged around a rotary driving shaft for use in fixing and holding the rotary blade between the rotary blade and the fixed blade.

With the above-described arrangement, the concave-shaped blade portions of the rotary blade and the convex-shaped blade portions of the fixed blade oppositely contact to each other to make an efficient cutting of the weeds in such a way that the grass is continuously cut by a scissors operation under a specified holding angle therebetween.

The concave-shaped blade portions of the rotary blade take the weeds with the extremity ends thereof into the area between the fixed blade and the convex-shaped blade portions and cut them and at the same time the taken weeds are pushed outwardly with the portions continuous to the circumferential portions thereof and are cut thereby.

The concave-shaped blade portions of the rotary blade increase the structural strength with the structures of the blade portions opened by the raised circumferential portions and have such rigidity that they are not damaged when striking against gravel or rocks.

Further, the concave-shaped arcuate blade portions of the rotary blade are made slightly higher than that of the continuous circumferential raised portions to cause them to be oppositely contacted with the convex-shaped blade portions of the fixed blade in a partially contacted condition, thereby maintaining a slide contacting force against the convex-shaped blade portions of the fixed blade.

A clearance effected between the rotary blade and the fixed blade as a result of formation of the shallow dish-like rotary blade by raising the circumferential edges of the rotary blade is partitioned into one at the circumferential blade portions of the rotary blade and the fixed blade and the other at the rotary driving shaft by a ring-shaped weed entangling preventive plate arranged around the rotary driving shaft for use in fixing and holding the rotary blade the entangling of weeds around the rotary drive shaft is prevented.

DETAILED DESCRIPTION OF THE PREFERRED EMBODIMENTS

Figure 1:
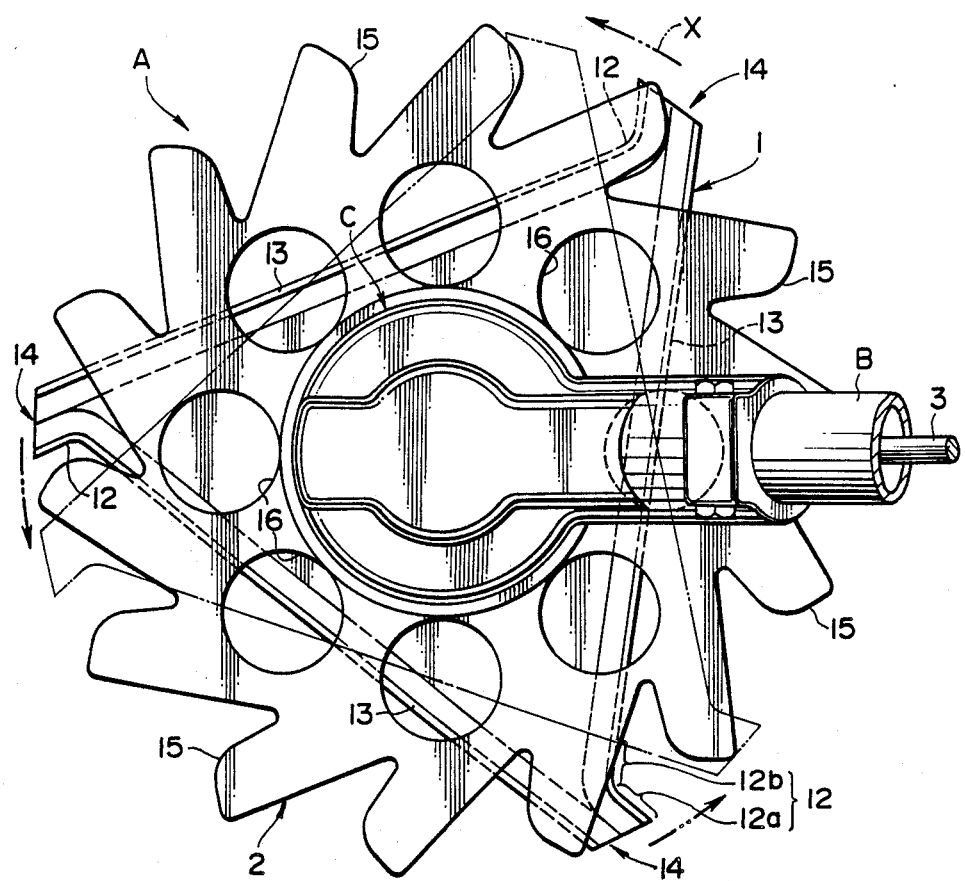
FIG. 1 is a top plan view.
Figure 2:
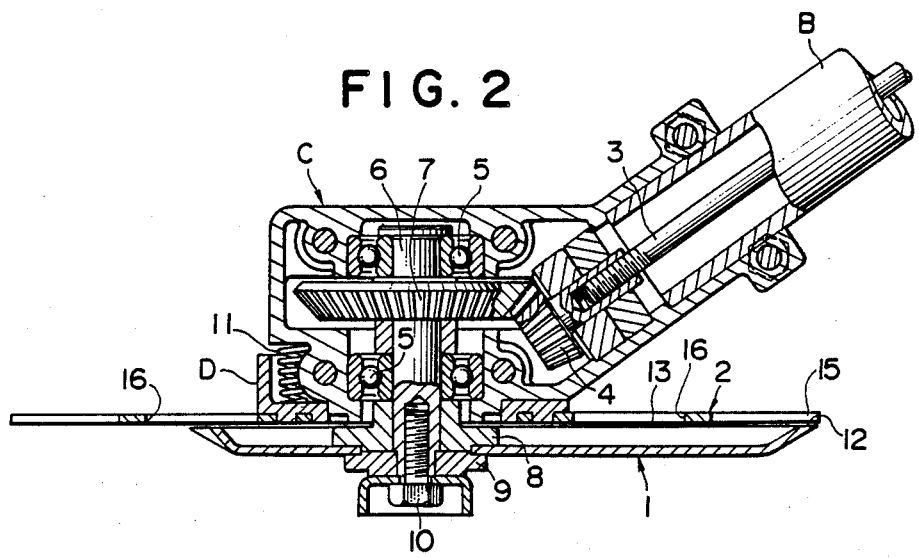
FIG. 2 is a sectional view partly broken away.

In reference to the accompanying drawings, FIG. 1 illustrates an example of a mowing machine in which a blade unit (A) constructed according to the preferred embodiment of the present invention is fixed to the lower surface of a head case (C) fixed at the extremity end of a gripping column (B) provided with a motor not shown, wherein the blade unit (A) is comprised of a rotary blade (1) and a fixed blade (2) coaxially. The fixed blade (2) is fixed non-rotatably through a fixed blade fixing holder (D) to a lower surface of the head case (C) storing a power transformation mechanism fixed to an extremity end of the gripping column (B). The head case (C) contains the power transformation mechanism which comprises a first bevel gear (4) connected to a power transmitting shaft (3) located within the gripping column (B) and a second bevel gear (7) attached to the rotary drive shaft (6) rotatably installed by a bearing (5) under its engaged condition with the gear (4) for transmitting a rotational force of the first bevel gear (4) to the drive shaft (6). The rotary blade (1) is fixed and held by a bolt 10 to the lower end part of the projecting rotary driving shaft (6) through an intermediate holder (8) and a holding washer (9). A spring (11) is located between the lower surface of the head case (C) and the upper surface of fixed blade fixing holder (D). The fixed blade (2) is resiliently and closely contacted with the rotary blade (1), and the rotary blade (1) is rotated under a power force from the driving machine to cut the weeds (M).

The rotary blade (1) is of shallow dish-like shape and of a substantial elongated rectangular shape as viewed in top plan or of a triangle or square or pentagonal or hexagonal shape and the like and is provided with concave blade portions (12) near each of its circumferential top end portions.

The concave blade portions (12) are constructed such that raised portions (13) of desired height are bent and raised in an inclined condition at their circumferential edges, and for example, as shown in the drawing, blade forming portions (14) having a substantial V-shaped or U-shaped opening at their top end surfaces are arranged at the circumferential edges of the rotary blade (1) formed into a shallow shape having a substantial triangle as viewed in its top plan. The raised portions at one side of the blade forming portion (14) positioned in a rotating direction (X) of the rotary blade (1) are extended and curved in concave sickle form toward the rotating direction (X), and the blade portions are formed at one side as raised portions.

An area ranging from a substantial central part of the concave blade portion (12) to an extremity end portion of the blade part forms a weed taking part (12a) and an area ranging continuously from the curved central part to the raised portion (13) at the circumferential edge is formed as a weed pushing part (12b). That is, the weeds (M) are cut while they are being taken into a space between the weed taking part (12a) and the convex-shaped blade portions (15) of the fixed blade (2) together with the convex-shaped blade portions (15) of the circumferential edges of the fixed blade (2) to be described later. The weeds (M) taken into the space between the convex-shaped blade portions (15) of the fixed blade (2) with the weed pushing portions (12b) are cut while being pushed outwardly.

The fixed blade (2) is formed as a flat plate, a plurality of convex-shaped blade portions (15) oppositely and slidably contacting with the concave-shaped blade portions (12) of the rotary blade (1) in a substantial constant holding angle (crossing angle) which is efficient in cutting the weeds are projected and formed at the circumferential edges of the fixed blade and at the same time a plurality of holes (16) for use in discharging the weeds (M) entering between the rotary blade (1) and the fixed blade (2) are formed inside the fixed blade (2).

Thus, the fixed blade (2) is closely overlapped on the upper surface of the rotary blade (1) and as the rotary blade (1) is rotated, the weeds (M) are taken into a space between the convex-shaped blade portions (15) of the fixed blade (2) with the weed taking portions (12a) of the concave-shaped blade portions (12) of the rotary blade (1) and cut, and at the same time the weeds (M) taken between the convex-shaped blade portions (15) of the fixed blade (2) are pushed outwardly at the weed pushing portions (12b) of the concave-shaped blade portions (12) and cut.

Figure 3:
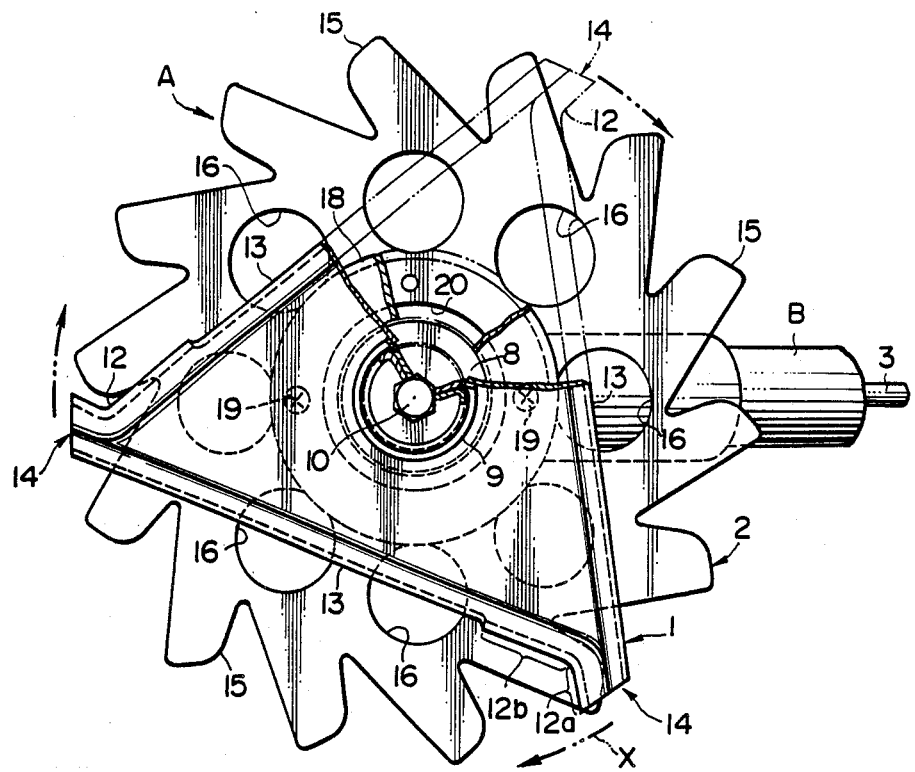
FIG. 3 is a bottom view of another preferred embodiment with a part broken away.
Figure 4:
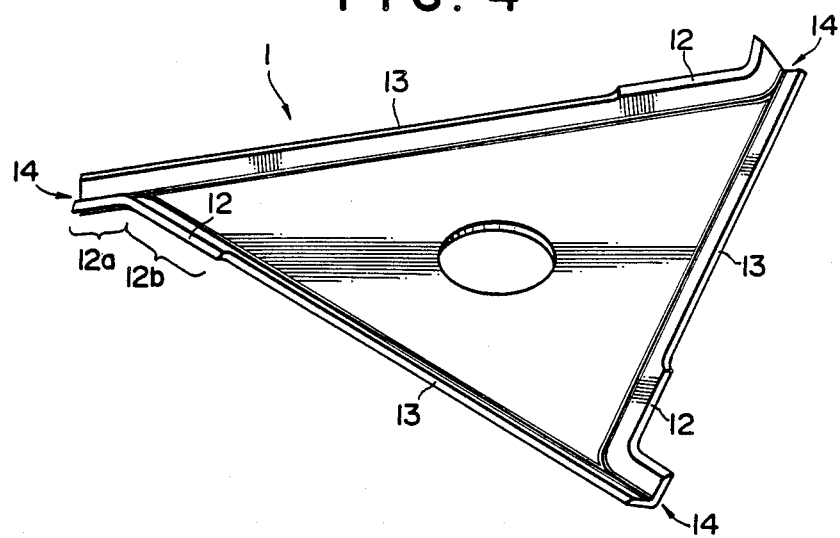
FIG. 4 is a perspective view of a rotary blade for use in the FIG. 3 assembly.

FIG. 3 illustrates another preferred embodiment of the blade unit (A) in which the blade unit (A) is basically the same as the construction of the rotary blade (1) and the fixed blade (2) described in detail in reference to FIG. 1. In this preferred embodiment, as shown in FIG. 4, the raised height of other circumferential edge raised portions (13) except the raised portions at one side positioned in a rotating direction (X) of the rotary blade (1) at the blade forming portions (14) arranged at the circumferential edges to be opened in a substantial V-shape or U-shape at their top end surfaces is formed slightly lower than that of the concave blade portions so as to constitute a discharging clearance (17) to cause the cut weeds (M) to be discharged between the rotary blade and the fixed blade (2). One side raised portions are formed as concave blade portions (12) comprised of the weed taking portion (12a) and the weed pushing portion (12b) and they are oppositely and slidably contacted always under a constant sliding contact force with a partial contacting structure in respect to the convex-shaped blades (15) at the circumferential edges of the fixed blade (2) (refer to FIG. 5).

Thus, concave-shaped blade portions (12) slightly higher than the raised height of other raised portions (13) of the circumferential edges and oppositely sliding contacted with the convex-shaped blade portions (15) at the circumferential edges of the fixed blade (2) with a partial contact structure capable of making a positive cutting of weeds (M) are formed at three blade forming portions (14) at the circumferential edges of the rotary blade (1) of which strength is enforced by a substantial V-shaped or U-shaped side surfaces so as to prevent the blade from being damaged immediately even if the blade strikes against gravel or rocks and the like dispersed on the ground during a mowing operation. The sliding contact force of the fixed blade (2) against the convex-shaped blade portions (15) at the circumferential edges is kept by the partial contact structure, even soft and shaky weeds and the like may positively be taken into a space between the weed taking portion (12a) of the concave-shaped blade portions (12) and the convex-shaped blade portions (15) of the fixed blade (2) and cut thereat. The weeds taken into areas between the convex-shaped blade portions (15) of the fixed blade (2) and the weed pushing portions (12b) can be positively cut while weeds are being pushed outwardly. The weeds taken into the areas between the rotary blade (1) and the fixed blade (2) are smoothly discharged from the discharging clearance (17) formed between the blades without being clogged between the raise portions (13) of the circumferential edges of the rotary blade (1) and the fixed blade (2).

The rotary blade (1) constructed in accordance with the preferred embodiment is made such that the raised portions (13) at the circumferential edges including the circumferential edge blade forming portions (14) forming the concave-shaped blade portions (12) are integrally pressed, one side raised portions of the blade forming potions (14) formed slightly higher than the raised portions (13) at the circumferential edges are polished in post-treatment to cause the concave-shaped blade portions (12) to be formed.

Figure 5:
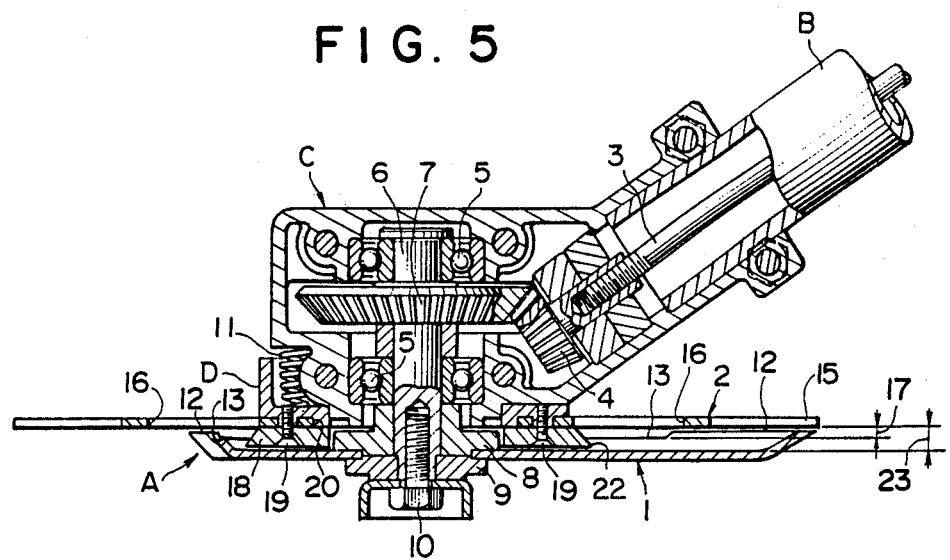
FIG. 5 is a sectional view of FIG. 3.
Figure 6:
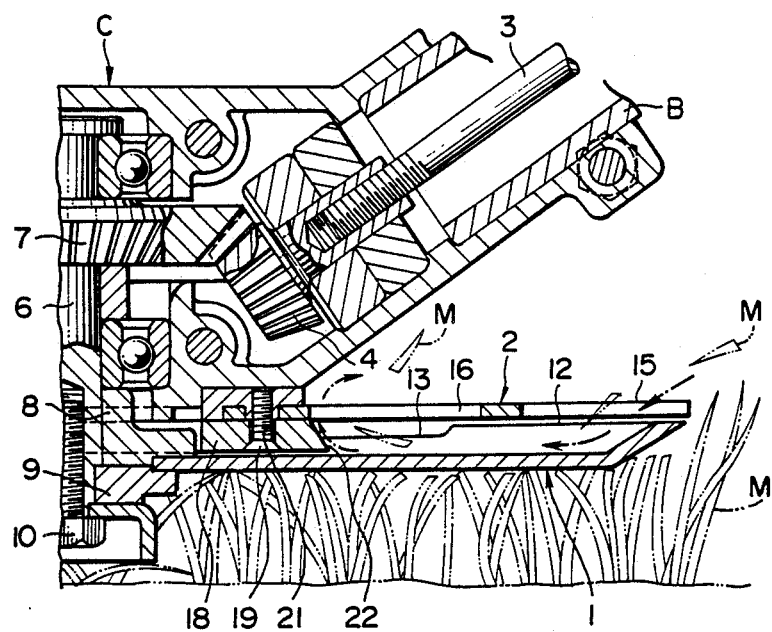
FIG. 6 is a partially enlarged sectional view similar to FIG. 5.

Further, a ring-shaped weed entangling preventive plate (18) is arranged and installed around the rotary driving shaft (6) for fixing and holding the rotary blade (1) between the rotary blade (1) and the fixed blade (2) (refer to FIGS. 5 and 6).

The weed entangling preventive plate (18) is engaged with and fixed to the lower surface of the opening edge of the fitting hole (20) made at the central part of the fixed blade (2) when the fixed blade (2) is fixed to the fixed blade attaching holder (D) with small screws (19) to cause itself to be placed between the fixed blade and the rotary blade (1). A wall thickness of the plate corresponds to a raised height of the concave-shaped blade portions (12) of the rotary blade (1) by metal or hard synthetic resin or other desired materials, its inner diameter is made substantially the same as that of the fitting hole (20) of the fixed blade (2), and the plate is formed as a ring shape having such an outer diameter as circumscribing along an edge of each of the holes (16) opened properly spaced apart around the fitting hole (20) and at the same time the surface oppositely placed against the small screw insertion holes of the fixed blade (2) are formed with small screw fixing holes (21).

As shown in FIG. 6, an outer circumferential edge surface of the weed entangling preventive plate (18) is made as an inclined edge surface (22) directed toward the edge of each of the holes (16) of the fixed blade (2) and the weeds taken into the clearance (23) are smoothly discharged and removed from each of the holes (16).

An outer circumferential edge surface of the weed entangling preventive plate (18) is not limited to the shape described above, but for example, has a vertical plane from the outer circumferential upper edge along the hole edge of each of the holes (16) to the midway part of its thickness direction and a substantial angle-shape inclined from the vertical plane toward the outer circumferential lower edge, and any shape can be applied if it enables the weeds taken into the clearance (23) to be smoothly guided toward each of the holes (16) of the fixed blade (2).

Thus, the rotary blade (1) is formed as a shallow dish-shape, blade forming portions (14) having a substantial V-shape or U-shape at the side thereof are arranged at three circumferential edge locations, a partial contacting structure capable of making a positive cutting of weeds (M) by slightly increasing its height than the raised height of the other raised portions (13) is arranged at the blade forming portion (14) so as to form the concave-shaped blade portions (12) oppositely and slidingly contacted with the convex-shaped blade portions (15) at the circumferential edges of the fixed blade (2), resulting in that an interior of the clearance (23) generated between the rotary blade (1) and the fixed blade (2) is partitioned into one facing to the blade portions (12) at the circumferential edges of both blades (1) and (2) including each of the holes (16) of the fixed blade (2) and the other facing to the holding unit (8) for use in fixing and holding the rotary blade (1) to the rotary driving shaft (6) with the holding washer (9) by the weed entangling preventive plate (18) installed and arranged within the clearance (23) under engagement and fixing to the fixed blade (2). The weeds (M) cut by the blades and taken into the clearance (23) are prevented from entering the installed holding unit (8) and it is further improved not to cause the weeds to entangle around the holding unit (8) or the rotary driving shaft (6). The rotary blade (1) is caused to rotate always at a constant rotational speed, the outer circumferential edge surface of the weed entangling preventive plate (18) having an inclined edge surface (22) directed toward each of the holes (16) of the fixed blade (2), thereby the weeds (M) taken into the clearance (23) are guided toward each of the holes (16) to make a positive discharging of the weeds (M) from the holes (16) (refer to FIG. 6).

As described above, according to the present invention, it is possible to cut the weeds continuously with the concave-shaped blade portions of the rotary blade and the convex-shaped blade portions of the fixed blade in a substantial constant angle (crossing angle) and therefore even if the rotary blade is rotated at a low speed, it is possible to make a positive cutting of the weeds and at the same time to reduce a variation of the load and to decrease a required power force.

In addition to the above, the weeds can positively be cut while they are being taken into areas between the extremity end portions (weed taking part) at the concave-shaped blade portions of the rotary blade and the convex-shaped blade portions of the fixed blade and the portions near the root (weed pushing part) can be cut while the taken weeds are being pushed outwardly, so that no clogging of the weeds occurs at the root part (weed pushing part) of the concave-shaped blade portions of the rotary blade and thus an efficiency of cutting operation can be improved.

Further, the circumferential edges of the rotary blade are raised, blade forming portions of which strength is enforced by opening the top end surfaces of the circumferential edges into a substantial V-shaped or U-shaped side surface, the raised portions at one side of the blade forming portions located in the rotating direction of the rotary blade are made slightly higher than that of the raised circumferential edges to make concave-shaped blade portions oppositely and slidably contacted with the convex-shaped blade portions at the circumferential edges of the foxed blade. Only the concave-shaped blade portions are partially contacted with the fixed blade and the circumferential raised portions except the concave-shaped blade portions are made slightly lower than the surrounding blade portions so as to form a weed discharging clearance between the circumferential raised portions and the fixed blade, resulting in that the concave-shaped blade portions of the rotary blade may not be damaged even if they strike against gravel or rocks and the like, a sliding contact force of the rotary blade against the blade portions of the fixed blade is always kept constant to perform a positive cutting of soft and shaky weeds and further an efficient mowing without leaving any non-cut weeds can be performed, the weeds taken into the areas between the fixed blade and the rotary blade can smoothly be discharged from the discharging clearance without being clogged.

In addition, the rotary blade can be manufactured by a method wherein the circumferential raised portions including the circumferential edge blade forming portions are integrally formed by a press work and only the arcuate blade portions formed slightly higher than the circumferential raised portions at the blade forming portions are ground or polished in post-treatment, resulting in that its manufacturing is simplified and its manufacturing cost is efficiently reduced.

Further, since the ring-shaped weed entangling preventive plate is placed and arranged around the rotary driving shaft in a clearance generated between the fixed blade and the rotary blade, the weed entangling preventive plate can prevent the weeds from entering the holder unit for use in fixing and holding the rotary blade to the rotary driving shaft with the holding washer. Therefore, there is no possibility that the weeds taken into the area between the rotary blade and the fixed blade entangle around the holder unit or rotary driving shaft to apply a bad influence against the rotation of the rotary blade and so a positive mowing of the weeds can be carried out for a long period of time under a specified rotational speed.

What is claimed is:

1. A grass mowing blade unit comprising, a housing, an upper fixed blade mounted on said housing, and a lower rotary blade co-axial with said fixed blade and mounted to said housing for rotation in one direction about a central axis of said blades, said rotary blade comprising a multi-sided, saucer-shaped, flat plate having corners, said plate having circumferential raised edge portions extending toward said fixed blade, said edge portions being interconnected at said corners and defining blade edge forming portions of substantially V-shape or U-shape in cross-section at said corners, and free ends of said blade edge forming portions extending in said one direction, said fixed blade comprising a flat plate having a plurality of convex-shaped blade portions outwardly extending from the periphery thereof, said blade edges forming portions sliding along said convex-shaped blade portions upon rotation of said rotary blade for the mowing of grass.

2. The blade unit according to claim 1, wherein each of said blade edge forming portions is of a predetermined height greater than the remainder of each said circumferential portions for forming discharge clearances through which the mowed grass discharges from between said blades.

3. The blade unit according to claim 1, wherein said circumferential raised edge portions are concavely shaped in cross-section.

4. The blade unit according to claim 1, wherein said free ends of said blade edge forming portions each comprise a grass taking-in portion, and the remainder of each said blade edge forming portion comprising a grass pushing-out portion, edge portions formed between said taking-in and said pushing-out portions at each said corner being concavely curved.

5. The blade unit according to claim 1, further comprising an annular protective washer fixedly mounted to said housing between said blades for preventing grass from being caught between said blades, said washer having a thickness substantially equal to the height of each said blade edge forming portions.

* * * * *